Aug. 7, 1928.
W. H. BENTLEY
1,680,079
MANUFACTURE OF PURE SULPHUR
Filed Aug. 16, 1926
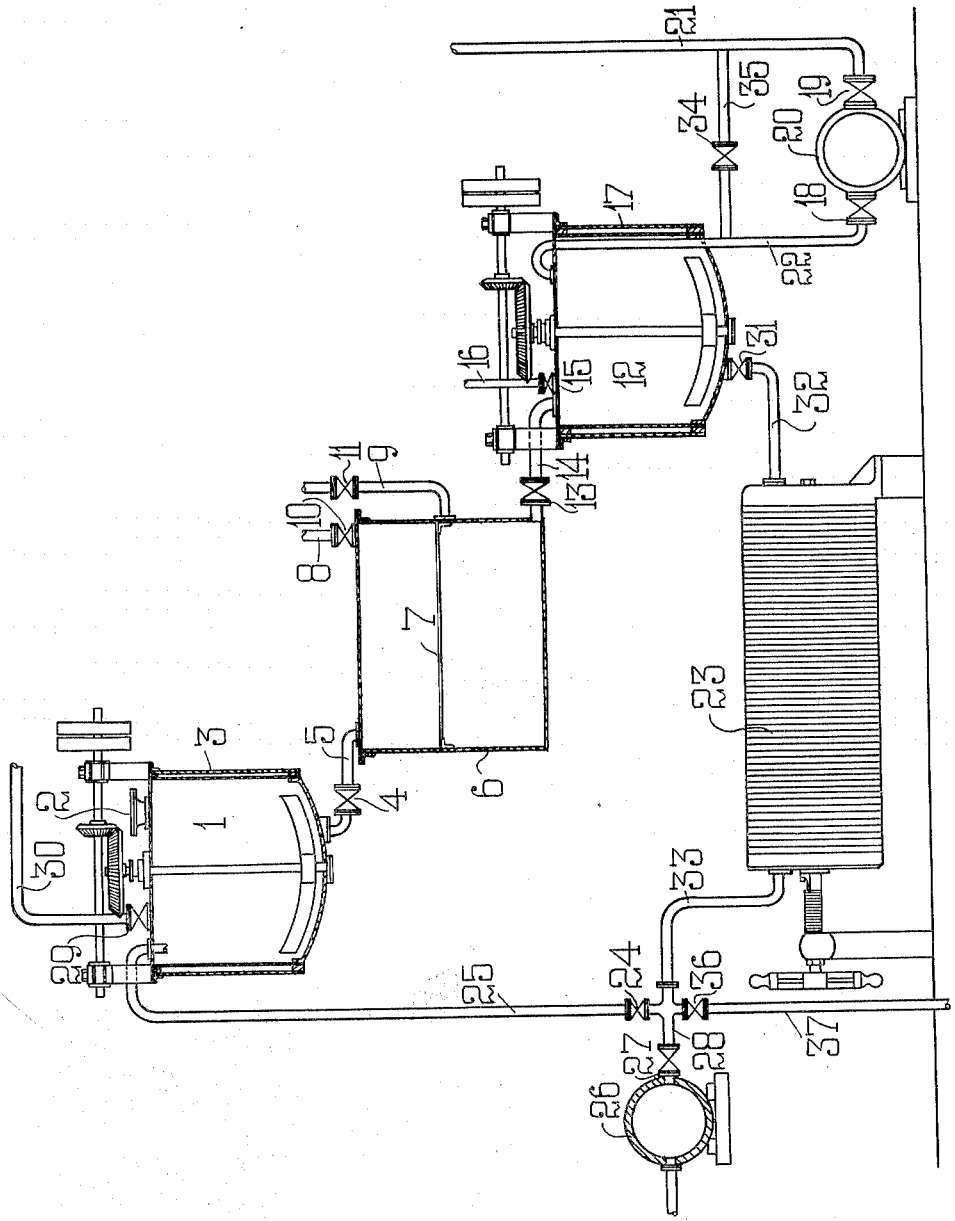
Inventor:-
William H. Bentley,
By Sturtevant Mason
attorneys.

Patented Aug. 7, 1928.

1,680,079

UNITED STATES PATENT OFFICE.

WILLIAM HENRY BENTLEY, OF BURNLEY, ENGLAND, ASSIGNOR OF TWO-THIRDS TO JOHN RILEY & SONS LIMITED, OF HAPTON, ENGLAND, A BRITISH COMPANY.

MANUFACTURE OF PURE SULPHUR.

Application filed August 16, 1926, Serial No. 129,561, and in Great Britain August 17, 1925.

My invention relates to an improved process for the manufacture of pure sulphur, especially from the crude sulphur of commerce.

The main object of the invention is to provide a cyclic process. Further objects are to provide improved methods of regenerating sulphur from polysulphide solutions, and to provide improved methods of economically working up crude sulphur into valuable products.

According to the present invention in its preferred form crude sulphur is dissolved in the mother liquor from a previous operation to form a solution of soluble polysulphide which is then treated with hydrogen sulphide under such conditions of temperature and pressure that elemental sulphur is precipitated. After solution of the crude sulphur the polysulphide solution is separated from insoluble impurities e. g. by filtration. Alkali or alkaline earth polysulphide may be employed e. g. sodium or calcium polysulphide.

The polysulphide is decomposed by hydrogen sulphide at a low temperature or under high pressure or both and the mother liquor is regenerated by the solution of crude sulphur therein at a high temperature or under reduced pressure or both. The hydrogen sulphide liberated in the process of regeneration may be collected and used to decompose the polysulphide to produce pure sulphur.

The pure sulphur is separated by filtration and washed with water until it is free from adhering soluble salts and dried.

The invention also includes an arrangement of apparatus suitable for carrying out the process.

The invention will be understood more clearly from the following description and its scope will be defined in the appended claims.

In a preferred form of the invention I may carry out the process in the apparatus illustrated in the accompanying drawing.

The jacketed pan 1 is charged through the hole 2 with water, sodium sulphide and crude sulphur in quantities necessary to produce the desired strength of sodium polysulphide (preferably the pentasulphide $Na_2S_5$) and the mixture is agitated and at the same time heated by passing steam into the jacket 3 until the sulphur goes into solution. The contents of the pan 1 are then cooled to about 40° C. by stopping the steam and circulating cold water through the jacket 3. The tap 4 on the outlet pipe 5 is then opened and the solution of the sodium polysulphide is run into a containing vessel 6 inside which it is passed through a simple filter bed 7. The space beneath the filter-bed is sufficient to hold the whole of one filtered charge. The container 6 is provided with vent pipes 8 and 9 carrying taps 10 and 11 respectively.

When the pan 1 is empty another batch of sodium polysulphide similar to the first is prepared in it, and while this is proceeding the contents of the container 6 are run into the jacketed pan 12 by opening the tap 13 on the outlet pipe 14 and the tap 15 on the vent pipe 16. The sodium polysulphide now in pan 12 is cooled to about 10° C. by agitation and by circulating cold water through the jacket 17. The taps 13 and 15 are now closed and the taps 18 and 19 opened and the pump 20 started whereby sulphuretted hydrogen is drawn from the gas holder (not shown) along the pipe 21 and forced along the pipe 22 into the pan 12 where it is absorbed by the sodium polysulphide which is kept in motion by an agitator. The pan 12 is constructed to stand at least a pressure of about 40 lbs. per square inch.

The introduction of the sulphuretted hydrogen causes the precipitation of sulphur from the polysulphide and while this is proceeding the second charge of sodium polysulphide in pan 1 is run into 6 through the filter 7. Then the next charge of crude sulphur is introduced through the charge hole 2 and the lid of 2 is securely bolted on. The pan 1 is put into communication with the filter press 23 by opening the tap 24 on the pipe 25 and the pair are filled with sulphuretted hydrogen by first pumping out the air by starting the suction pump 26 and opening the tap 27 on the pipe 28 and then after closing the tap 27 opening the tap 29 on the pipe 30 and thus admitting sulphuretted hydrogen from the gas holder.

The apparatus is now ready for the filtration of the precipitated sulphur and when the pressure of the gas in the pan 12 has reached the amount found by practice to be the most suitable the tap 31 on the outlet pipe 32 is opened and the charge blown out of the pan 12 through the filter press 23, the filtered liquor and excess gas passing along the pipes 33 and 25 into the pan 1. Here the excess gas disengages itself and passes along the pipe 30 back to the gasholder.

When the charge in the pan 12 has been blown out by the pressure of the sulphuretted hydrogen, the pump 20 is stopped and the taps 31, 18, and 19 are closed and the tap 34 on the branch pipe 35 is opened to allow the gas under pressure in the pan 12 to return to the gasholder via the pipe 21. The second charge of sodium polysulphide standing in the container 6 is now run down into the pan 12 to await its treatment with sulphuretted hydrogen gas as just described and the tap 34 on the branch pipe 35 is closed. The purified sulphur in the filter press 23 is now washed with clean water and the first washings containing the bulk of the mother liquor adhering to the sulphur is allowed to pass along the pipes 33 and 25 to the pan 1 and then the tap 24 is closed and the tap 36 on the pipe 37 is opened and the final wash water is allowed to run to the drain until a test shows that the last traces of mother liquor have been washed free from the sulphur. The sulphur is then blown as dry as possible by the stream of air, removed from the filter press and the drying completed in any suitable manner. The water and air pipes to the filter press are not shown in the sketch. The mother liquor and washings now in the pan 1 are agitated with the crude sulphur previously placed in the pan and the pan is heated by the steam jacket. Sulphuretted hydrogen is evolved and the sulphur goes into solution forming a fresh batch of sodium polysulphide. When the sulphuretted hydrogen has all been evolved from the hot liquid the tap 29 is closed and the lid of the charging hole 2 is taken off and the liquor is allowed to evaporate until the desired strength of polysulphide is attained and then the liquor is cooled to 40° C. by circulating cold water through the jacket. The polysulphide solution is then run into the container 6, being filtered through the bed 7, and remains there until the pan 12 is emptied and ready to receive it. Another charge of crude sulphur is introduced into the pan 1 and the charging hole 2 closed and the cycle of operations as just described is repeated continuously.

By making the filter press 23 sufficiently large several batches can be filtered before the necessity of washing and emptying the press arises whereby some of the losses of sodium sulphide in the wash water can be avoided. The slight losses of sodium sulphide are made good by the addition of the necessary quantities to the pan 1 when the crude sulphur is introduced.

In place of sodium sulphide I may employ other soluble sulphides such as postassim or calcium sulphides.

I have described the invention in such a way that it can be performed without the aid of any theory but we believe that a reversible reaction occurs by which polysulphide plus sulphuretted hydrogen give hydrosulphide plus sulphur and vice versa and in the preferred form of my process we cause the reaction to take place cyclically by operating alternately in hot and cold solutions. But I may also shift the equilibrium in the desired sense by the application of pressure or vacuum in hot or preferably in cold solutions especially if in the latter case the crude sulphur is ground so finely that it dissolves with sufficient speed.

I declare that what I claim is:—

1. The cyclic process of preparing pure sulphur which comprises decomposing a polysulphide solution by hydrogen sulphide, separating the precipitated pure sulphur from the mother liquor and dissolving crude sulphur in the hydrosulphide mother liquor to give a polysulphide solution which can again be treated with hydrogen sulphide.

2. The cyclic process of preparing pure sulphur which comprises dissolving crude sulphur in a hydrosulphide solution, removing solid impurities, treating the solution with hydrogen sulphide, separating the precipitated pure sulphur from the mother liquor and again dissolving crude sulphur in the mother liquor.

3. The cyclic process of preparing pure sulphur which comprises dissolving crude sulphur in a hydrosulphide solution to evolve hydrogen sulphide, and then treating the solution with said hydrogen sulphide to precipitate pure sulphur therefrom.

4. The process of treating crude sulphur which comprises dissolving it in a hydrosulphide solution and removing solid impurities so as to give a purified polysulphide solution and hydrogen sulphide.

5. The process of refining crude sulphur which consists in dissolving it in a hydrosulphide solution and shifting the equilibrium between hydrogen sulphide and solution so as to obtain solid pure sulphur.

6. The process of refining crude sulphur which consists in dissolving it in a hot hydrosulphide solution, filtering and cooling the liquor so obtained, and treating the cooled liquor with hydrogen sulphide and separating the thus precipitated pure sulphur.

7. The step in the process of refining crude sulphur which consists in dissolving it in a hot hydrosulphide solution.

8. The step in the process of refining crude sulphur which consists in dissolving it in a hot hydrosulphide solution and filtering the liquor so obtained.

9. The step in the process of refining crude sulphur which consists in dissolvi g it in a hot hydrosulphide solution and filtering the liquor so obtained and then precipitating pure sulphur therefrom.

10. The cyclic process of preparing pure sulphur which comprises dissolving crude sulphur in a hydrosulphide solution at a raised temperature, collecting the hydrogen sulphide evolved, removing solid impurities from the solution, treating the cooled solution with the hydrogen sulphide, and separating and recovering the precipitated pure sulphur from the solution which is then ready for further use in the cycle.

11. The step in the manufacture of pure sulphur which consists in preparing a polysulphide solution from crude sulphur and precipitating said polysulphide solution with hydrogen sulphide.

In witness whereof, I have hereunto signed my name this 31 day of July 1926.

WILLIAM HENRY BENTLEY.